ANTI-FEEDBACK SYSTEM

Filed Oct. 1, 1957

INVENTOR,
JOHN L. FAHERTY JR.
BY
Harry M. Saragovitz
ATTORNEY.

United States Patent Office 3,050,582

Patented Aug. 21, 1962

3,050,582

ANTI-FEEDBACK SYSTEM

John L. Faherty, Jr., 135 Woodland Drive, Fair Haven, N.J.

Filed Oct. 1, 1957, Ser. No. 687,593
1 Claim. (Cl. 179—1)
(Granted under Title 35, U.S. Code (1952), sec. 266)

Figure 1:
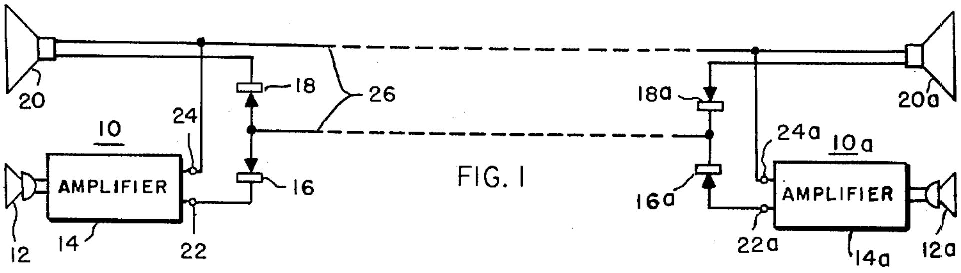

The invention described herein may be manufactured and used by or for the Government for governmental purposes, without the payment of any royalty therein.

The present invention relates in general to intercommunications systems, and in particular to an improved arrangement for preventing regenerative feedback, sidetones, or singing in systems in which simultaneous two-way transmission over a single circulit is employed.

Numerous methods have been proposed for eliminating feedback in such systems, principally by the use of hybrid impedances and various forms of duplexing schemes. These methods have suffered from one or more of the disadvantages in that they were complex, not too effective, critical in adjustment and/or expensive.

It is an object of this invention to provide a simple and inexpensive substitute for the previous methods of feedback elimination.

In accordance with the invention, the transmit and receive channels of a two-way communications circuit are polarized, with one channel polarized to pass positive polarity signals and the other negative polarity signals. Thus, although these channels are connected input to output, positive feedback or regeneration will not occur. While this does eliminate the portion of the signal which does not correspond to the signal polarity passed, it has been determined experimentally that the resulting distortion does not appreciably affect the intelligibility of the signal when reproduced. This is believed due to signal reconstruction subsequent to polarization brought about by incidental circuit reactance, usually present in communication circuits. The polarization may be conveniently accomplished by means of a non-linear resistance such as a simple rectifier or a single ended Class B amplifier, which both rectifies and amplifies, or by any desired combination of the two. In is necessary that the non-linear means chosen have forward and back resistances suitable to pass or reject the signal levels to be encountered.

In one form of the invention two non-linear resistances are oppositely connected in series with a sound reproducer such as a loud-speaker to the output of a microphone amplifier, this combination forming one station of an intercommunications system. With this circuit connection, regardless of the polarity of the amplifier output, no signal from the amplifier may enter the reproducer as one of the non-linear resistances will present a relatively high resistance between the amplifier and the reproducer. If a second intercommunications station is connected to the one just described so as to form a series circuit with the first station amplifier output and which takes in only one of the non-linear resistances, then one polarity portion of the signal output of the amplifier will be passed to the second station. Similarly, the opposite polarity portion of a signal originated by the second station will be passed to the first station. Thus, while two-way transmission is not prevented by the non-linear resistances, undesired feedback in the feedback loop which would ordinarily exist through microphone-amplifier-loudspeaker-microphone is prevented. If desired, of course, the second station may be identical to the first station and thus have the same feedback prevention feature. Similarly, there there may exist an intercommunications network having a number of such stations interconnected as indicated.

In a second form of the invention the feedback loop to be polarized against feedback consists solely of an electrical feedback loop as opposed to the electro-acoustical feedback loop just described. In one application of this form of the invention polarization would be applied to telephone line repeater amplifiers. These amplifiers customarily produce amplification in both directions over a telephone line and feedback is prevented through the use of hybrid coils. Instead, it is proposed that non-linear resistances be included in the amplifier circuits to pass one signal polarity in one direction and the other signal polarity in the other direction. In this way, the output of any one amplifier can be prevented from reaching the input of the other amplifier and a regenerative feedback loop be prevented.

The features of my invention which I believe to be novel are set forth with particularity in the appended claim. The invention itself, however, both as to its organization and method of operation, together with further objects and advantages thereof may best be understood by reference to the following description taken in conjunction with the accompanying drawing in which:

FIGURES 1 through 5 show schematic circuit diagrams of embodiments of the invention.

Referring to FIGURE 1, there is shown a first two-way communication station 10 consisting of a microphone 12 connected to the input of amplifier 14. Diodes 16 and 18, oppositely poled, are connected in series with loudspeaker 20 across the output of amplifier 14 at terminals 22 and 24. A two-wire circuit 26 connects communications station 10 with a second station 10*a* which, as shown, is substantially identical to station 10. Thus the microphone and speaker being acoustically connected may be considered to form one emitter receiver signal energy terminal and the line connection the other. The diodes 16*a* and 18*a* are shown with opposing polarization with respect to line circuit 26 to thus complement the polarization introduced by the first station. This complementary polarization is not, however, necessary since, as indicated above, circuit reactance will normally restore sufficiently the missing portion of the signal. In other words, the signal ultimately received will have sufficient positive and negative components that either polarity of polarization may be provided by any station. In the event there is a shortage of reactance to accomplish the desired reconstruction it may, of course, be introduced by auxiliary means at an appropriate point in the circuit.

To follow the operation of FIGURE 1, assume that sound is impressed on microphone 12. The amplified electrical version of the sound will appear as alternating current between the lower terminal of diode 16 and upper terminal of loudspeaker 20. Since diodes 16 and 18, although in series, are oppositely polarized, one of the diodes will always offer a high resistance to the alternating current and thus loudspeaker 20 will not be energized by current from amplifier 10; it follows that no regenerative feedback loop will develop. During the period of the signal when the voltage at amplifier output terminal 22 is negative with respect to terminal 24, the signal will be passed by diode 16 to the line 26, and at station 10*a*, the signal will be passed by diode 18*a* and be reproduced by loudspeaker 20*a*. If a signal is originated at station 10*a*, the operation described will be similar except that due to the reversed polarization of diodes 16*a* and 18*a* the signal voltages passed to the line will be those which are positive at terminal 22*a* with respect to terminal 24*a*.

Figure 2:
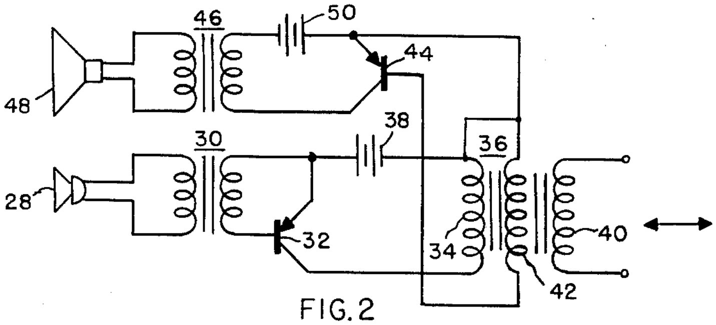

FIGURE 2 shows a schematic circuit diagram of a polarized transmitter-reproduced combination to be used as one station of a two-way transmission system which employs transistor grounded emitter Class B amplifiers to provide the opposite polarization accomplished by diodes 16 and 18 in FIGURE 1. Microphone 28 is connected to the primary winding of transformer 30. The secondary winding of transformer 30 is connected as an input between the base and emitter of p-n-p transistor 32, the transmitter amplifier. The output of transistor 32 is obtained through the connection of a first winding 34 of transformer 36 between the collector of transistor 32 and the negative terminal of collector bias source 38. The positive terminal of this source is returned to the emitter of the transistor 32. A second winding 40 on transformer 36 serves as the input-output connection for the transmitter-receiver assembly and by which it would be connected to other stations. A third winding 42 on transformer 36 is connected between the emitter and base of transistor 44, the receiver amplifier. The output of transistor 44 is connected by means of output transformer 46 to loudspeaker 48. Bias source 50 is connected in series with the primary winding of transformer 46 between the collector and base of transistor 44. A common reference point between amplifiers is established by the connection of the emitter of transistor 44 to the minus terminal of bias source 38. Windings of transformer 36 are poled to provide in-phase coupling between the output of transistor 32 and input of transistor 44. The amplifiers themselves, being connected in grounded emitter form, produce a phase reversal. Because of this phase reversal, the conduction or rectification periods of the respective Class B amplifiers are not in-phase and thus the desired opposite polarization of the amplifiers is obtained. To consider signal reception with the circuit, it will be noted that if a signal is received from another station on winding 40 and impressed across winding 42, the input of transistor 44 will respond to the signal during the period when the input is negative, that is when the signal is negative on the base of the transistor with respect to the emitter. The output of this transistor will be reproduced by loudspeaker 48 which is connected to the transistor through transformer 46. In transmitting, a sound impressed on microphone 28 causes a signal voltage to be impressed by transformer 30 between the base and emitter of transistor 32. Transistor 32 will respond to the negative input portion of the signal and the output of transistor 32 may be connected via winding 40 of transformer 36 to a second station. Since the voltage swing seen by the base of transistor 44 is positive, transistor 44 will be unresponsive and positive feedback will not occur.

Figure 3:
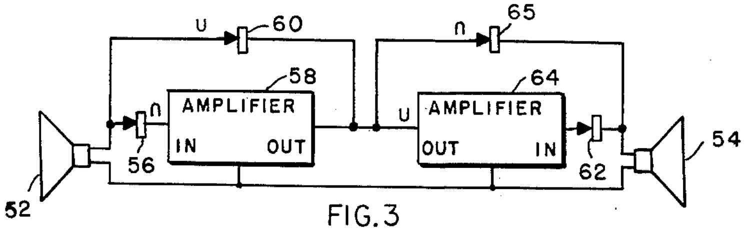

FIGURE 3 shows a schematic circuit diagram of a two-station intercommunications circuit employing polarized transmission to prevent feedback. It consists of the combination transmitter-receiver electro-acoustical transducers 52 and 54 interconnected by diode 56, amplifier 58 bridged by diode 60, diode 62, and amplifier 64 bridged by diode 65. It will be observed that the polarization produced by the diodes is such as to allow positive signal voltage to be transmitted from left to right and negative signal voltage from right to left. Each of the amplifiers is adapted to provide an output which is in-phase with its input; and of course of greater magnitude than the input. Therefore, each of the bridging diodes is blocked when the amplifier which it bridges is energized. However, when for example a signal is originated at the left station, and thus amplifier 58 is energized, bridging diode 65 will provide a low impedance by-pass around amplifier 64. Similarly, when amplifier 64 is energized, by-pass around amplifier 58 is provided by diode 60.

Figure 4:
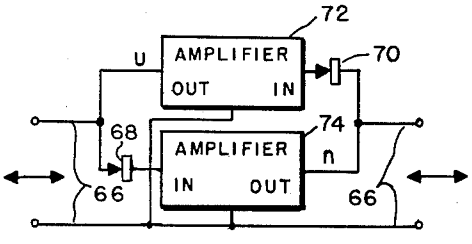

FIGURE 4 shows a schematic circuit diagram of the invention utilized as a repeater-amplifier in telephone line 66. By means of polarized diodes 68 and 70, positive polarity signals are amplified from left to right through amplifier 72, and negative signals from right to left in amplifier 74. In this manner the repeater-amplifiers are operated without feedback producing tones.

Figure 5:
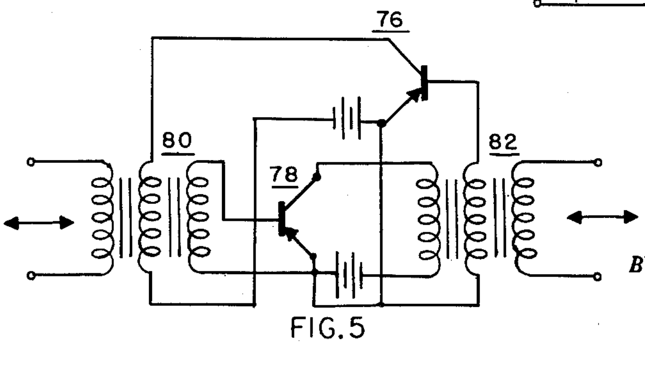

FIGURE 5 shows two transistor Class B operated amplifiers 76 and 78 connected for repeater service in a telephone line with transformers 80 and 82 serving as line to amplifier coupling transformers. The output voltage of each amplifier is fed in-phase to the input of the other amplifier. A common reference between amplifiers is provided by interconnecting the emitter of transistor 76 with the emitter of transistor 78. As noted with respect to FIGURE 2, with this amplifier arrangement regenerative feedback will not develop, thus making possible amplification in both directions over the line.

While there has been described what is at present considered to be the preferred embodiments of this invention, it will be obvious to those skilled in the art that various changes and modifications may be made therein without departing from the invention, and it is, therefore, aimed in the appended claim to cover all such changes and modifications as fall within the true spirit and scope of the invention.

What is claimed is:

A system for simultaneous communications in two directions comprising a two conductor transmission line; a first and second diode, each having one electrode connected to one of said conductors, at a first station; a third and fourth diodes, each having the other electrode connected to said one of said conductors, at a second station; a first transmitting and a first receiving transducer at said first station; a second transmitting and a second receiving transducers at said second station; said first transmitting transducer at said first station having one terminal connected to the other electrode of said first diode and another terminal connected to the other of said conductors; said second receiving transducer at said second station having a first terminal connected to the one electrode of said third diode and another terminal connected to said other of said conductors; said second transmitting transducer at said second station having one terminal connected to the one electrode of said fourth diode and another terminal connected to the other of said conductors; and said first receiving transducer at said first station having one terminal connected to the other electrode of said second diode and another terminal connected to the other of said conductors.

References Cited in the file of this patent

UNITED STATES PATENTS

| | | |
|---|---|---|
| 2,236,645 | Levy | Apr. 1, 1941 |
| 2,545,467 | Jealin | Mar. 20, 1951 |
| 2,607,035 | Levine | Aug. 12, 1952 |
| 2,659,774 | Barney | Nov. 17, 1953 |
| 2,662,123 | Koenig | Dec. 8, 1953 |
| 2,691,073 | Lowman | Oct. 5, 1954 |
| 2,743,314 | Jealin | Apr. 24, 1956 |